United States Patent [19]

Suga et al.

[11] Patent Number: 5,061,755

[45] Date of Patent: Oct. 29, 1991

[54] POLYPROPYLENE COMPOSITION AND HIGHLY TRANSPARENT POLYPROPYLENE FILM MADE THEREOF

[75] Inventors: Yoshinori Suga, Machida; Eiji Tanaka, Kawasaki; Hidehito Katou, Kurashiki; Yasuo Maruyama, Tokyo; Eiji Isobe, Yokohama, all of Japan

[73] Assignee: Mitsubishi Kasei Corporation, Tokyo, Japan

[21] Appl. No.: 426,020

[22] Filed: Oct. 24, 1989

[30] Foreign Application Priority Data

| Oct. 25, 1988 | [JP] | Japan | 63-268769 |
| Dec. 12, 1988 | [JP] | Japan | 63-313473 |
| Sep. 7, 1989 | [JP] | Japan | 1-232586 |

[51] Int. Cl.$^5$ ............ C08L 53/00; C08L 23/10; C08L 23/18; C08F 297/08
[52] U.S. Cl. .................... 525/95; 525/247; 525/321
[58] Field of Search ............ 525/247, 321, 95

[56] References Cited

U.S. PATENT DOCUMENTS

| 4,210,729 | 7/1980 | Hermans et al. | 525/247 |
| 4,210,735 | 7/1980 | Hermans et al. | 526/119 |
| 4,210,738 | 7/1980 | Hermans et al. | 526/152 |
| 4,551,501 | 11/1985 | Shiga et al. | 525/88 |
| 4,603,174 | 7/1986 | Okada et al. | 525/240 |

FOREIGN PATENT DOCUMENTS

| 0152701 | 8/1985 | European Pat. Off. |
| 1030797 | 5/1966 | United Kingdom |
| 1104665 | 2/1968 | United Kingdom |

OTHER PUBLICATIONS

WPIL, File Supplier, AN=86—221342, Derwent Publications Ltd, London, GB; & JP-A-61 151 204 (IDEMITSU PETROCHEM.) 09-07-1986 *whole abstract*.

WPIL, File Supplier, AN—88—124332, Derwent Publications Ltd, London, GB; & JP-A-63 069 809 (Mitsui Toatsu Chemical) 29-03-1988.

FR-A-1 434 150 (Imperial Chemical Inductries)*p. 1, left-hand column, lines 23-29; p. 2, left-hand column, lines 6-35; p. 2, left-hand column, lines 1-4*.

*Primary Examiner*—Carman J. Seccuro
*Attorney, Agent, or Firm*—Oblon, Spivak, McClelland, Maier & Neustadt

[57] ABSTRACT

A highly crystalline propylene polymer composition which is obtained by preliminarily polymerizing, in the presence of a catalyst comprising a solid titanium trichloride catalyst complex containing a complexing agent and having an aluminum content of at most 0.15 by atomic ratio of aluminum to titanium and an organoaluminum compound and optionally an electron donative compound, 3-methylbutene-1 in an amount exceeding 10 g per g of the solid titanium trichloride catalyst complex and then polymerizing propylene, or propylene and other α-olefin having from 2 to 18 carbon atoms, in an amount of at least 500 g per g of the solid titanium trichloride catalyst complex, and which contains from 0.01 to 20% by weight of the 3-methylbutene-1 polymer based on the total weight of the 3-methylbutene-1 polymer-containing propylene polymer composition.

23 Claims, No Drawings

POLYPROPYLENE COMPOSITION AND HIGHLY TRANSPARENT POLYPROPYLENE FILM MADE THEREOF

The present invention relates to a highly crystalline propylene polymer composition and a highly transparent polypropylene film made thereof.

Propylene polymers are excellent in the moldability and mechanical strength and inexpensive and thus widely used as plastics of general purpose. However, depending upon the field of their application, it is desired to improve their properties such as rigidity, transparency and high cycle injection moldability without impairing various characteristics specific to the propylene polymers. It is known that such properties can be improved by increasing the crystallization rate of the propylene polymers.

With respect to additives to improve the crystallization rate, many proposals have already been made. Commercially available additives include an aluminum salt of an aromatic carboxylic acid, dibenzylidene sorbitol and a substituted dibenzylidene sorbitol.

These additives (hereinafter referred to as nucleating agents) are all low molecular weight substances and have drawbacks such that when used as nucleating agents, they present odors and thus are not useful for food products, they decompose or sublime during molding thereby leading to generation of gas or staining of the die, or they have poor dispersibility to propylene polymers, whereby a twin-screw kneader is sometimes required to increase the dispersibility.

On the other hand, to overcome such drawbacks of the conventional nucleating agents, several methods have been proposed in which polymer compounds are used as nucleating agents.

Japanese Unexamined Patent Publication No. 139731/1985 proposes a method wherein a polymer of a vinylcycloalkane having at least 6 carbon atoms (hereinafter referred to simply as a vinylcycloalkane) is used as a polymer nucleating agent. While presenting a relatively good result, this method still has some problems in connection with the production of a propylene polymer containing the polymer of the vinylcycloalkane. Firstly, as disclosed in the publication, the polymerization of the vinylcycloalkane is conducted in the presence of a solvent in a state where the concentration of the vinylcycloalkane is low. Since the vinylcycloalkane has low polymerization acitivities, it takes a long time for production, and the productivity is low. On the other hand, if the concentration of the vinylcycloalkane is increased for the purpose of shortening the polymerization time, the following problem will result in connection with the removal of the vinylcycloalkane before introduction of propylene for the subsequent step of polymerizing propylene. Namely, the vinylcycloalkane has a high boiling point and is hardly removable by purging, and it is required to employ a washing method by means of an inert solvent, whereby it also takes a long time and the productivity is low. There will be another problem that the activities and stereospecificity of the propylene polymerization tend to deteriorate due to a modification of the catalyst during the washing or polymerization for a long period of time.

With respect to the improvement of the transparency and rigidity of a propylene polymer by incorporating a 3-methylbutene-1 polymer to a propylene polymer, there is a proposal made long ago in Japanese Examined Patent Publication No. 32430/1970. According to this publication, a copolymer of propylene with an α-olefin having from 4 to 18 carbon atoms containing a 3-methylbutene-1 polymer, is prepared by a stepwise polymerization method wherein the feed monomer is sequentially changed, by using a catalyst system composed of a combination of titanium trichloride and diethylaluminum chloride obtained by reducing $TiCl_4$ with ethylaluminumsesquichloride. This publication discloses that the transparency of the copolymer of propylene with other α-olefin having from 4 to 18 carbon atoms thus obtained is improved. However, the effect for the improvement of the transparency is still inadequate, and there is no effect for improvement with respect to a propylene homopolymer. In this publication, the above-mentioned low activity catalyst is used, and naturally the polymerization amount of 3-methylbutene-1 per g of the titanium catalyst component is small, the molecular weight of the 3-methylbutene-1 polymer can not adequately be high for the reason which will be described hereinafter, and the ability of the catalyst for controlling the stereospecificity is so low that it is not possible to obtain a highly crystalline 3-methylbutene-1 polymer, whereby the effect for improving the transparency is considered to be inadequate. Also with respect to the productivity, it takes from a few hours to a few tens hours to obtain a desired amount of the 3-methylbutene-1 polymer, and thus the productivity of the propylene polymer composition is very low.

Likewise, Japanese Unexamined Patent Publications No. 275111/1987 and No. 151204/1986 disclose a method wherein a catalyst system is treated with 3-methylbutene-1 to obtain a 3-methylbutene-1 polymer, followed by polymerization of propylene to obtain a propylene polymer composition containing the 3-methylbutene-1 polymer. Japanese Unexamined Patent Publication No. 275111/1987 discloses a method wherein a Ti-containing catalyst system supported on a certain specific Mg type catalyst is employed. However, the nucleating effect of the 3-methylbutene-1 polymer in the publication is low as compared with a vinylcyclohexane polymer, and the improvement in the crystallization temperature of the propylene polymer composition containing the 3-methylbutene-1 polymer is less than 10° C. as compared with the crystallization temperature of the propylene polymer containing no 3-methylbutene-1 polymer. In Japanese Unexamined Patent Publication No. 151204/1986, the effect for improving the rigidity of a 3-methylbutene-1 polymer corresponds to an ethylene polymer, and such improvement in the rigidity is not substantially attributable to the nucleating effect. In these two systems, the ability of the catalyst system for controlling the stereospecificity is low as in the case of the above-mentioned Japanese Examined Patent Publication No. 32430/1970, and the polymerization amount of 3-methylbutene-1 per the titanium catalyst component is small, whereby the nucleiforming ability is considered to be inadequate.

Further, above-mentioned Japanese Unexamined Patent Publication No. 139731/1985 also discloses a propylene polymer composition containing a 3-methylbutene-1 polymer. However, the nucleating effect of the 3-methylbutene-1 polymer in that publication is further small, and the improvement in the crystallization temperature of the propylene polymer containing the 3-methylbutene-1 polymer is only 4° C. as compared with the crystallization temperature of the propylene polymer containing no 3-methylbutene-1 polymer. In this publication, the melting point of the 3-methylbutene-1 polymer used, is disclosed to be 303° C., and it is therefore apparent that the crytallinity of the 3-methylbutene-1 polymer thus obtained would be inadequate. This is considered to be primarily due to the low ability of the catalyst system for controlling the stereospecificity. Further, the polymerization amount of the 3-methylbutene-1 polymer per the Ti type catalyst component is as low as 0.31 g. Also from this point, the nucleating performance of the 3-methylbutene-1 polymer is considered to be inadequate.

Japanese Unexamined Patent Publications No. 156305/1989 and No. 156353/1989 disclose a method wherein a Ti-containing catalyst system supported on a certain specific Mg type carrier is used. Such a method has already been proposed by the present inventors in Japanese Unexamined Patent Publication No. 126306/1989. Such a method presents a certain effect for improving the crystallization rate, rigidity and transparency of the propylene polymer, but the performance is still inadequate as compared with the 3-methylbutene-1 polymer-containing propylene polymer composition of the present invention. As described in the foregoing, a 3-methylbutene-1 polymer-containing propylene polymer composition having an adequately high effect for improving the crystallinity, has not been known.

The present inventors have conducted extensive research to improve the 3-methylbutene-1 polymer as a polymer nucleating agent and as a result, have found it possible to obtain a 3-methylbutene-1 polymer-containing propylene polymer composition having a remarkably high crystallization temperature by a two step polymerization method wherein 3-methylbutene-1 is preliminarily polymerized in a certain specific amount by using a certain specific catalyst system, followed by polymerization of propylene and to obtain a film having the transparency further improved by using such a polymer composition. The present invention has been accomplished on the basis of such discoveries.

Namely, the present invention provides a highly crystalline propylene polymer composition which is obtained by preliminarily polymerizing, in the presence of a catalyst comprising a solid titanium trichloride catalyst complex containing a complexing agent and having an aluminum content of at most 0.15 by atomic ratio of aluminum to titanium and an organoaluminum compound and optionally an electron donative compound, 3-methylbutene-1 in an amount exceeding 10 g per g of the solid titanium trichloride catalyst complex and then polymerizing propylene, or propylene and other α-olefin having from 2 to 18 carbon atoms, in an amount of at least 500 g per g of the solid titanium trichloride catalyst complex, and which contains from 0.01 to 20% by weight of the 3-methylbutene-1 polymer based on the total weight of the 3-methylbutene-1 polymer-containing propylene polymer composition.

The present invention also provides a highly transparent polypropylene film which contains a propylene polymer composition obtained by preliminarily polymerizing, in the presence of a catalyst comprising a solid titanium trichloride catalyst complex containing a complexing agent and having an aluminum content of at most 0.15 by atomic ratio of aluminum to titanium and an organoaluminum compound and optionally an electron donative compound, 3-methylbutene-1 in an amount exceeding 10 g per g of the solid titanium trichloride catalyst complex and then polymerizing propylene, or propylene and other α-olefin having from 2 to 18 carbon atoms, in an amount of at least 500 g per g of the solid titanium trichloride catalyst complex, and which contains from 0.003 to 0.5% by weight of the 3-methylbutene-1 polymer based on the total weight of the 3-methylbutene-1 polymer-containing propylene polymer composition.

Now, the present invention will be described in detail with reference to the preferred embodiments.

In the present invention, the higher the crystallinity of the 3-methylbutene-1 polymer used, the higher the effect for improving the optical properties. The melting point and the heat of fusion measured by a differential scanning calorimeter are used as indices for crystallinity.

The melting point of the 3-methylbutene-1 polymer used in the present invention is preferably higher than 303° C., more preferably higher than 305° C., and the heat of fusion is preferably at least 15 cal/g, more preferably at least 16 cal/g.

As a catalyst system to be used to obtain such a 3-methylbutene-1 polymer, a catalyst is employed, which comprises a solid titanium trichloride catalyst complex containing a complexing agent and having an aluminum content of at most 0.15 by atomic ratio of aluminum to titanium and an organoaluminum compound and optionally an electron donative compound.

Such a catalyst is disclosed, for example, in Japanese Examined Patent Publications No. 27871/1979, No. 8451/1980, No. 8452/1980, No. 8003/1980, No. 39165/1980 and No. 14054/1980.

The catalyst system will be described in further detail.

The solid titanium trichloride catalyst complex may be a solid titanium trichloride compound obtained by reducing TiCl$_4$ with an organoaluminum compound of the formula AlR$_n$X$_{3-n}$ wherein R is a hydrocarbon group having from 1 to 20 carbon atoms, preferably an alkyl group having from 1 to 20 carbon atoms, more preferably an alkyl group having from 2 to 6 carbon atoms, X is a halogen atom, and n is a number of from 1 to 3, followed by treatment with a complexing agent having an electron donative atom or group such as an ether, a thioether, an amine, an amide, a ketone, an ester or a phosphine and optionally by treatment with CCl$_4$ or TiCl$_4$, or a solid titanium trichloride compound precipitated by heating or by TiCl$_4$ treatment from a uniform hydrocarbon solution of a liquid comprising TiCl$_3$ and a complexing agent having an electron donative atom or group such as an ether and optionally TiCl$_4$, or a solid titanium trichloride compound precipitated by reducing TiCl$_4$ with an organoaluminum compound of the formula AlR$_n$X$_{3-n}$ wherein R is a hydrocarbon group having from 1 to 20 carbon atoms, preferably an alkyl group having from 1 to 20 carbon atoms, more preferably an alkyl group having from 2 to 6 carbon atoms, X is a halogen atom, and n is a number of from 1 to 3. The complexing agent is selected from the group consisting of ethers, thioethers, amines, amides, ketones, esters and phosphines. Preferred are ethers, particularly dialkyl ethers having from 3 to 10 carbon atoms Such dialkyl ethers include, for example, di-n-butyl ether, di-n-amyl ether, dioctyl ether, didecyl ether, amylbutyl ether, ethylhexyl ether and hexyloctyl ether. It is particularly preferred to employ a solid titanium trichloride catalyst complex obtained by reducing titanium tetrachloride with an organoaluminum Compound of the formula AlR$_n$X$_{3-n}$ wherein R is a hydrocarbon group having from 1 to 20 carbon atoms, preferably an alkyl group having from 1 to 20 carbon atoms, more preferably an alkyl group having from 2 to 6 carbon atoms, X is a halogen atom, and n is a number of from 1 to 3, in the presence of a dialkyl ether.

The atomic ratio of aluminum to titanium in the solid titanium trichloride catalyst complex is at most 0.15, preferably at most 0.1, more preferably at most 0.02. If the atomic ratio of aluminum to titanium exceeds 0.15, the stereospecificity or the activity tends to decrease, such being undesirable.

As the organoaluminum compound, an alkylaluminum compound of the formula $AlClR_2$ wherein R is an alkyl group having from 1 to 18 carbon atoms, is preferred. As such an alkylaluminum compound, diethylaluminum monochloride, diisopropylaluminum monochloride and diisobutylaluminum monochloride may, for example, be mentioned.

The molar ratio of the organoaluminum compound to Ti in the solid titanium trichloride catalyst component is from 0.1 to 100, preferably from 0.2 to 10. It is preferred that the Al/Ti molar ratio is controlled at a low level during the polymerization of 3-methylbutene-1 and at a high level during the polymerization of propylene.

As an agent for improving the stereospecificity, an electron donative compound such as a carboxylate, a silicate, an ether, an amine or a phosphate may be added at the time of the polymerization. Among them, a carboxylate such as methyl methacrylate is preferred.

It is preferred to employ a titanium trichloride catalyst which, when applied for the polymerization of propylene, gives a propylene polymer with a boiling heptane non-extracted content being at least 97%, more preferably at least 98%. If a catalyst which gives a boiling heptane non-extracted content of less than 97%, is used, a non-crystalline polymer is produced as a by-product together with the crystalline polymer during the production of the 3-methylbutene-1 polymer, whereby even if the crystallinity of the crystalline polymer is high, the non-crystalline polymer hinders the nucleating effect, such being undesirable.

As the polymerization method, a two step polymerization method is preferred wherein 3-methylbutene-1 is polymerized by using the above-mentioned catalyst system at a polymerization temperature of from 0° to 100° C., preferably from 20° to 80° C., in a hydrocarbon medium or by using 3-methylbutene-1 itself as a solvent under such a condition that a high level of stereoregularity can be attained, and then homopolymerization of propylene or copolymerization of propylene with other α-olefin having from 2 to 18 carbon atoms is conducted continuously without deactivating the catalyst, after the removal of unreacted 3-methylbutene-1 and after washing with a hydrocarbon solvent or without such washing, under a similar temperature condition in the presence or absence of a solvent. As said α-olefin, an α-olefin having from 2 to 10 carbon atoms is preferred. Specifically, ethylene, butene, hexene, octene and decene may, for example, be mentioned.

In order to obtain adequate performance of the 3-methylbutene-1 polymer as a nucleating agent, it is not sufficient to merely use the above-mentioned catalyst system, and it is required that the polymerization amount of 3-methylbutene-1 per g of the titanium catalyst component in the 3-methylbutene-1 polymer contained, is more than 10 g, preferably more than 15 g. More preferably, the polymerization amount of 3-methylbutene-1 is more than 15 g and not more than 500 g. Most preferably, it is more than 15 g and not more than 300 g.

The reason is not yet clearly understood. However, 3-methylbutene-1 has a low growing rate in the polymerization as compared with a linear α-olefin such as propylene, and under a condition such that the production rate of a polymer per catalyst is low, the molecular chain is not adequately grown i.e. the molecular weight is low, whereby the nuclei-forming ability is believed to be low for some reason.

A similar reduction in the nuclei-forming ability is observed also when the molecular weight is controlled in the presence of hydrogen during the polymerization of 3-methylbutene-1. Therefore, it is evident that the molecular weight is influential over the nuclei-forming ability of the 3-methylbutene-1 polymer. From such a viewpoint, the molecular weight of the 3-methylbutene-1 polymer to be used in the present invention is, for the sake of convenience, represented by a melt index measured at 320° C. (measured in accordance with ASTMD-1238 (320° C., 2.16 kg) by adding 0.2 part of each of Irganox ® 1010, Irgaphos ® P-EPQ (both manufactured by Nippon Ciba Geigy Company) and Decahydroanthracene, as stabilizers, to the polymer powder). The melt index (MI) is usually $MI \leq 100$ g/10 min, preferably $MI \leq 50$ g/10 min. Accordingly, it is preferred that hydrogen is not present during the polymerization of 3-methylbutene-1.

The inadequency in the nuclei-forming ability of the conventional 3-methylbutene-1 polymers, is considered to be attributable to lacking in at least one of the above-mentioned various properties.

In the second step, propylene, or propylene and other α-olefin having from 2 to 18 carbon atoms, are polymerized in an amount of at least 500 g, preferably at least 1,000 g, more preferably at least 2,000 g, per g of the solid catalyst component, although it depends also on the polymerization amount of 3-methylbutene-1.

If the polymerization amount of propylene per the solid catalyst component is less than the above-mentioned range, the nuclei-forming ability per the 3-methylbutene-1 polymer decreases.

The content of the 3-methylbutene-1 polymer in the 3-methylbutene-1 polymer-containing propylene polymer composition of the present invention is from 0.01 to 20% by weight, preferably from 0.05 to 5% by weight. The propylene polymer in the 3-methylbutene-1 polymer-containing propylene polymer composition may be a random copolymer of propylene with other α-olefin having from 2 to 18 carbon atoms, but is preferably a propylene homopolymer.

The polypropylene film of the present invention is obtained by using the above-mentioned 3-methylbutene-1 polymer-containing propylene polymer composition as a starting material for film-forming. However, a mixture of such polymer composition with other crystalline propylene polymer such as a propylene homopolymer, random or block copolymer, may be used as a starting material for film-forming. As a means for mixing such a mixture, a common means such as an extruder, a Brabender kneader or a roll, may be employed. The mixing is preferably conducted by kneading at a temperature within a range not exceeding the melting point of the 3-methylbutene-1 polymer.

With respect to the content of the 3-methylbutene-1 polymer in the film material, the amount of the 3-methylbutene-1 polymer in the propylene polymer composition is preferably from 0.003 to 0.5% by weight, more preferably from 0.05 to 0.5% by weight. If the content of the 3-methylbutene-1 polymer is too small, the effect for improving the crystallization rate which will be described hereinafter, tends to be inadequate, whereby the transparency tends to deteriorate. On the other hand, if the content of the 3-methylbutene-1 polymer is too high, there will be problems such as formation of fish eyes, deterioration of the transparency due to the 3-methylbutene-1 polymer itself or due to the increase in the crystallization rate, and an increase of the costs.

In the present invention, it is possible to incorporate to the propylene polymer composition various additives which are commonly used, such as an antioxidant, a lubricant, an antistatic agent, an antiblocking agent and a known filler such as silica.

The film-forming method may be of a usual type such as a T-die molding method or an inflation molding method. The film may be stretched at least in one axial direction. The stretching method may be any optional method such as tenter stretching, roll stretching or tubular stretching. Preferably, however, a base sheet is prepared by T-die molding, and then a tenter stretching method is applied thereto.

In the T-die molding, a chill roll is provided in front of the T-die, and the temperature of the chill roll is preferably from 40° to 100° C., more preferably from 50° to 70° C., for molding. If the temperature of the chill roll is too low, the rigidity of the film during the molding tends to be high, waving of the edge portions is likely to result and the contact to the roll tends to be poor, whereby the film will be non-uniform, and the transparency deteriorates. On the other hand, if the roll temperature is too high, the crystallization proceeds too quickly, thus leading to deterioration of the transparency.

The crystallization rate of the 3-methylbutene-1 polymer-containing propylene polymer composition as a film material, is preferably within a range of from 2 to 50 seconds. If the crystallization rate is less than 2 seconds, the crystallization is too fast that the contact of the propylene polymer film to the chill roll will be poor, and the transparency deteriorates. On the other hands, if the crystallization rate is higher than 50 seconds, there will be growth of spherical crystals, whereby the transparency will deteriorate.

Now, the present invention will be described in further detail with reference to Examples. However, it should be understood that the present invention is by no means restricted by such specific Examples. The values for the physical properties in the following Examples were measured in accordance with the following methods.

1) Meltflow index (MFI) of the propylene polymer: Measured in accordance with ASTM D-1238 (230° C., 2.16 kg).

2) Haze: Measured in accordance with ASTM D-1003.

3) Crystallization temperature (Tc): Measured by a differencial scanning calorimeter 9900 Model, manufactured by Dupont, at a temperature raising and lowering speed of 10° C./min.

4) Parallel light transmittance:
Clarity meter TM-ID Model, manufacured by Murakami Shikisai Kenkyusho, was used. With the clarity meter, the total light transmittance was set to be 100, and a spotlight was projected to the center of each section of a film piece. The film piece was rotated once, and only the linear light rays (parallel light rays) were taken out, and the maximum amount of light was read to obtain the parallel light transmittance.

5) Spherical crystal size:
The diameters of spherical crystals along the cross section of a sheet having a thickness of 1.5 mm were measured by a polarizing microscope ($\times 200$).

CATALYST PREPARATION EXAMPLE 1

Into an autoclave having a capacity of 1 l and thoroughly flushed with nitrogen, 515 ml of purified toluene was charged at room temperature, and under stirring, 65.1 g (0.5 mol) of n-butyl ether, 94.9 g (0.5 mol) of titanium tetrachloride and 28.6 g (0.24 mol) of diethyl aluminum chloride were added to obtain a brown uniform solution. Then, the temperature was raised to 30° C. Upon expiration of 30 minutes, the temperature was raised to 40° C. and maintained at 40° C. for two hours. Then, 32 g (0.17 mol) of titanium tetrachloride and 15.5 g (0.058 mol) of tridecyl methacrylate were added, and the temperature was raised to 98° C. The temperature was maintained at 98° C. for two hours, and then granular purple solid was separated and washed with toluene to obtain solid titanium trichloride. The atomic ratio of Al/Ti of this solid catalyst component was 0.004.

CATALYST PREPARATION EXAMPLE 2

Into a 500 ml flask equipped with a stirrer and a thermometer, 5 g of commercially available $Mg(OC_2H_5)_2$ was charged under sealing with purified nitrogen, and 7.4 g of $Ti(OC_4H_9)_4$ and 4.6 g of tetraethoxysilane were added thereto. The temperature was raised under stirring, and the reaction was conducted at 130° C. for one hour. Then, the temperature was lowered to 100° C., and a toluene solution of 8.2 g of phenol was dropwise added thereto. After the dropwise addition, the temperature was raised to 130° C., and the reaction was conducted for one hour to obtain a yellow solid slurry reaction product.

To this product, 87 ml of purified toluene was added, and the mixture was cooled to $-20°$ C., and 25 g of $TiCl_4$ was added at $-20°$ C. After the addition, the temperature was gradually raised to 80° C., and then 1.3 g of ethyl benzoate was added, and the mixture was maintained at 80° C. for one hour. Then, the mixture was washed with purified toluene to obtain a solid product.

Then, 82 g of $TiCl_4$ and 1.3 g of ethyl benzoate were added, and the solid product was treated at 80° C. for one hour. Then, the product was washed four times with 200 ml of purified toluene at room temprature to obtain 4.8 g of a solid catalyst component. The Ti content in this solid product was 2.8% by weight.

To the solid component, triethyl aluminum was added in toluene to bring the atomic ratio of Al/Ti to 2, and the mixture was aged for two hours at room temprature.

CATALYST PREPARATION EXAMPLE 3

In the same manner as in Catalyst Preparation Example 2, 4.8 g of commercially available $MgCl_2$ was charged, and 25 ml of purified n-decane and 23.5 ml of 2-ethylhexanol were added thereto. The temperature was raised under stirring, and the reaction was conducted at 130° C. for two hours.

Then, 1.1 g of phthalic anhydride was added at the same temperature. After the addition, the reaction was conducted at 130° C. for one hour to obtain a uniform solution.

This solution was dropwise added to 345 g of TiCl$_4$ cooled to −20° C., over a period of one hour. After the dropwise addition, the temperature was gradually raised so that upon expiration of 4 hours, the temperature reached 110° C. At 110° C., 2.8 g of diisobutyl phthalate was added, and the reaction was conducted at that temperature for two hours.

Then, the product was filtered under a hot condition to obtain a solid portion. The solid portion was suspended in 345 g of TiCl$_4$. Then, the temperature was raised to 110° C., and the reaction was conducted at 110° C. for two hours. Then, the product was washed twice with 200 ml of hot n-decane and further five times with 200 ml of purified n-hexane at room temperature to obtain 3.5 g of a solid catalyst component.

The Ti content of this component was 3.2% by weight.

CATALYST PREPARATION EXAMPLE 4

This is an Example of a solid catalyst component wherein no complexing agent is used.

Into a 300 ml flask thoroughly flushed with nitrogen, 38.5 ml of purified n-hexane and 175 mmol of titanium tetrachloride were charged, and while stirring the mixture at 0° C., 103.7 ml of a n-hexane solution containing 2.7 mol/l of ethylaluminum sesqui chloride was dropwise added at a constant rate for three hours. The mixture was further stirred at 0° C. for two hours, and then washed with purified n-hexane until the remaining liquid ratio became 1/1,000. The solvent was changed from n-hexane to n-heptane, and the product was further treated at 95° C. for two hours and then left to cool to obtain a solid titanium trichloride catalyst.

EXAMPLE 1

Into a 2 l induction stirring type autoclave thoroughly flushed with purified argon, 1.2 mmol of diethylaluminum chloride was charged at room temperature under sealing with argon, and 700 cc of liquid 3-methylbutene-1 was charged.

Then, the temperature was raised to 70° C., and 91 mg of the solid catalyst component obtained in Catalyst Preparation Example 1 was added, and polymerization of 3-methylbutene-1 was conducted for one hour. Then, 3-methylbutene-1 was purged entirely, and then 3 mmol of diethylaluminum chloride and 0.12 mmol of methyl methacrylate were added, and 0.5 kg/cm$^2$ of H$_2$ and 700 g of propylene were added, and homopolymerization of propylene was conducted. Thirty minutes later, propylene was purged, and the catalyst was removed by a solvent mixture of isobutanol and n-hexane to obtain 271 g of a propylene polymer composition inclusive of the 3-methylbutene-1 polymer. The amount of the 3-methylbutene-1 polymer obtained from the experiment under the same polymerization condition except that no propylene polymerization was conducted, was 10.8 g. The melting point of this 3-methylbutene-1 polymer was 311° C., and the heat of fusion was 20 cal/g.

The content of the 3-methylbutene-1 polymer in the propylene polymer composition as calculated from the yield of the above 3-menthylbutene-1 polymer, was 4.0% by weight. This polymer had MFI of 0.27 g/10 min, a melting point of 163.4° C. and a crystallization temperature of 126.6° C.

EXAMPLE 2

Into a 24 l induction stirring type autoclave thoroughly flushed with purified argon, 26.2 mmol of diethylalumium chloride was charged at room temperature under sealing with argon, and 3,000 cc of liquid 3-methylbetene-1 was charged.

Then, the temperature was raised to 70° C., and 2,022 mg of the solid catalyst component obtained in Catalyst Preparation Example 1 was added, and polymerization of 3-methylbutene-1 was conducted for 45 minutes. Then, 3-methylbutene-1 was purged entirely, and then 52.4 mmol of diethylaluminum chloride and 2.62 mmol of methyl methacrylate were added, and 9 l of purified n-hexane was added, and 0.25 kg/cm$^2$ of H$_2$ was added. Then, the temperature was raised to 70° C., and propylene was added to bring the propylene pressure to 6 kg/cm$^2$, and homopolymerization of propylene was conducted. Three hours later, propylene was purged, and the catalyst was removed by a solvent mixture of isobutanol and n-hexane to obtain 4,261 g of a propylene polymer composition inclusive of the 3-methylbutene-1 polymer.

The amount of the 3-methylbutene-1 polymer obtained from the experiment conducted under the same polymerization condition except that no propylene polymerization was conducted, was 213 g.

The content of the 3-methylbutene-1 polymer in the propylene polymer composition calculated from the yield of the above 3-methylbutene-1 polymer, was 5.0% by weight.

This polymer had MFI of 0.62 g/10 min, a melting point of 164.5° C. and a crystallization temperature of 128.0° C. Further, the boiling heptane non-extracted content was 98.5%.

EXAMPLE 3

Into a 24 l induction stirring type autoclave thoroughly flushed with purified argon, 25.9 mmol of diethylaluminum chloride was charged at room temperature under sealing with argon, and 3,000 cc of liquid 3-methylbutene-1 was further charged.

Then, the temperature was raised to 70° C., and 2,000 mg of the solid catalyst component obtained in Catalyst Preparation Example 1 was added, and polymerization of 3-methylbutene-1 was conducted for 8 minutes. Then, 3-methylbutene-1 was purged entirely, and 51.9 mmol of diethylaluminum chloride and 2.59 mmol of methyl methacrylate were added, and 9 l of purified n-hexane was added, and 0.25 kg/cm$^2$ of H$_2$ was added. Then, the temperature was raised to 70° C., and propylene was added to bring the propylene pressure to 6 kg/cm$^2$, and homopolymerization of propylene was conducted. Three hours later, propylene was purged, and the catalyst was removed by a solvent mixture of isobutanol and n-hexane to obtain 4093 g of a propylene polymer composition inclusive of the 3-methylbutene-1 polymer.

The amount of the 3-methylbutene-1 polymer obtained from the experiment conducted under the same polymerization condition except that no propylene polymerization was conducted, was 41 g.

The content of the 3-methylbutene-1 polymer in the propylene polymer composition calculated from the yield of the above 3-methylbutene-1 polymer, was 1.0% by weight.

This polymer had MFI of 1.6 g/10 min, a melting point of 165.0° C. and a crystallization temperature of 128.6° C. Further, the boiling heptane non-extracted content was 98.5%.

EXAMPLE 4

Into a 1 l induction stirring type autoclave thoroughly flushed with purified argon, 2,596 mg of the solid catalyst component obtained in Catalyst Preparation Example 1, 400 ml of purified n-hexane and 120 ml of purified 3-methylbutene-1 were charged at room temperature under sealing with argon.

Then, the temperature was raised to 70° C., and 8.4 mmol of diethylaluminum chloride was added, and polymerization of 3-methylbutene-1 was conducted for 30 minutes. Then, the product was washed with purified n-hexane at room temperature to obtain a 3-methylbutene-1 polymer-containing catalyst having 12 g of 3-methylbutene-1 polymerized per g of the titanium catalyst component.

Into a 2 l induction stirring type autoclave thoroughly flushed with purified argon, 3.0 mmol of diethylaluminum chloride, 0.10 mmol of methyl methacrylate and the above 3-methylbutene-1 polymer-containing catalyst in an amount of 78.8 mg as the Ti catalyst component, were charged at room temperature under sealing with argon. Then, 1.0 kg/cm$^2$ of hydrogen and 700 g of propylene were added. The temperature was raised to 70° C., and homopolymerization of propylene was conducted. Sixty minutes later, propylene was purged, and the catalyst was removed by a solvent mixture of isobutanol and n-hexane to obtain 315 g of a propylene polymer composition inclusive of the 3-methylbutene-1 polymer. The content of the 3-methylbutene-1 polymer in the propylene polymer composition was 0.3% by weight. This polymer had MFI of 2.5 g/10 min, a melting point of 164.0° C. and a crystallization temperature of 126.0° C. Further, the boiling heptane non-extracted content was 8.1%.

EXAMPLE 5

Into a 2 l induction stirring type autoclave thoroughly flushed with purified argon, 1.2 mmol of diethylaluminum chloride was added at room temperature under sealing with argon, and 400 cc of liquid 3-methylbutene-1 was further charged.

Then, the temperature was raised to 70° C., and 92.7 mg of the solid catalyst component obtained in Catalsyt Preparation Example 1 was added, and polymerization of 3-methylbutene-1 was conducted for 3 hours. Then, 3-methylbutene-1 was purged entirely, and 2.4 mmol of diethylaluminum chloride and 0.12 mmol of methyl methacrylate were added, 1.0 kg/cm$^2$ of H$_2$ and 700 g of propylene were added, and homopolymerization of propylene was conducted at 70° C. Thirty minutes later, propylene was purged, and the catalyst was removed by a solvent mixture of isobutanol and n-hexane to obtain 212 g of a propylene polymer composition inclusive of the 3-methylbutene-1 polymer.

The amount of the 3-methylbutene-1 polymer obtained from the experiment conducted under the same polymerization condition except that no propylene polymerization was conducted, was 23.86 g.

The content of the 3-methylbutene-1 polymer in the propylene polymer composition calculated from the yield of the above 3-methylbutene-1 polymer, was 11.3% by weight.

This polymer had MFI of 1.7 g/10 min, a melting point of 164.7° C. and a crystallization temperature of 130.2° C. The boiling heptane non-extracted content was 98.8%.

5.0 parts by weight of the polymer and 95.0 parts by weight of a propylene homopolymer (MFI=8.5 g/10 min, melting point: 162.1° C., crystallization temperature: 112.6° C.) were mixed in a powder state and kneaded at 230° C. by a single-screw extruder having a dalmage screw of 30 mm in diameter mounted. The resulting propylene polymer composition had MFI of 9.0 g/10 min, a melting point of 165.0° C. and a crystallization temperature of 125.5° C.

COMPARATIVE EXAMPLE 1

Into a 1 l induction stirring type autoclave thoroughly flushed with purified argon, 5,003 mg of the solid catalyst component obtained in Catalyst Preparation Example 1, 400 ml of purified n-hexane and 13.5 ml of purified 3-methylbutene-1 were charged at room temperature under sealing with argon.

Then, the temperature was raised to 70° C., and 16.2 mmol of diethylaluminum chloride was added, and polymerization of 3-methylbutene-1 was conducted for 30 minutes. Then, the product was washed with purified n-hexane at room temperature to obtain a 3-methylbutene-1 polymer-containing catalyst having 1.2 g of 3-methylbutene-1 polymerized per g of the titanium catalyst component.

Into a 2 l induction stirring type autoclave thoroughly flushed with purified argon, 1,000 ml of purified n-hexane, 9.6 mmol of diethylaluminum chloride, 0.32 mmol of methyl methacrylate and the above 3-methylbutene-1 polymer-containing catlayst in an amount of 247 mg as the Ti catalyst component, were charged at room temperature under sealing with argon. Then, 0.07 kg/cm$^2$ of hydrogen was added, and the temperature was raised to 70° C. Then, propylene was added to bring the propylene pressure to 2 kg/cm$^2$, and homopolymerization of propylene was conducted. Twenty minutes later, propylene was purged, and the catalyst was removed by a solvent mixture of isobutanol and n-hexane to obtain 27.1 g of a propylene polymer composition inclusive of the 3-methylbutene-1 polymer.

The content of the 3-methylbutene-1 polymer in the propylene polymer composition was 1.1% by weight. This polymer had MFI of 1.0 g/10 min, a melting point of 163.1° C. and a crystallization temperature of 122.3° C.

COMPARATIVE EXAMPLE 2

Into a 2 l induction stirring type autoclave thoroughly flushed with pruified argon, 0.2 mmol of triethylaluminum was added at room temperature under sealing with argon, and 650 cc of liquid 3-methylbutene-1 was further charged.

Then, the temperature was raised to 70° C., and 124 mg of the solid catalyst component obtained in Catalyst Preparation Example 2 was added, and polymerization of 3-methylbutene-1 was conducted for one hour. Then, 3-methylbutene-1 was purged entirely, and 4.3 mmol of triethylaluminum and 1.3 mmol of p-methylmethylbenzoate were added, and 1 kg/cm$^2$ of H$_2$ and 700 g of propylene were further added, and homopolymerization of propylene was conducted. Twenty minutes later, propylene was purged to obtain 456 g of a propylene polymer composition inclusive of the 3-methylbutene-1 polymer.

The amount of the 3-methylbutene-1 polymer obtained from the experiment under the same polymerization condition except that no propylene polymerization was conducted, was 25 g.

The content of the 3-methylbutene-1 polymer in the propylene polymer composition calculated from the yield of the above 3-methylbutene-1 polymer, was 5.4% by weight.

This polymer had MFI of 0.72 g/10 min, a melting point of 163.8° C. and a crystallization temperature of 122.2° C.

COMPARATIVE EXAMPLE 3

Into a 1 l induction stirring type autoclave thoroughly flushed with purified argon, 210 mg of purifed hexane was added under sealing with argon and cooled to 0° C. Then, 25 mmol of triethylaluminum, 5 g of 3-methylbutene-1, 5 mmol of trimethylmethoxysilane and 3.74 g of the catalyst component obtained in Catalyst Preparation Example 3 were charged, and the autoclave was closed, and polymerization was conducted at 20° C. for three hours under stirring. After completion of the polymerization, the reaction mixture was taken out under an argon atmosphere. Then, the liquid portion was isolated and slurried with n-hexane. The preliminary polymerization amount was 0.95 g per g of the catalyst.

Into a 24 l induction stirring type autoclave flushed with purified argon, 10 l of purified n-hexane was added, and 9.4 mmol of triethylaluminum, 0.94 mmol of cyclohexylmethyldimethoxysilane and the above 3-methylbutene-1 polymer-containing catalyst in an amount of 285 mg as the Ti catalyst component, were charged under a propylene atmosphere at room temperature. Then, 0.25 kg/cm$^2$ of hydrogen was introduced, and the temperature was raised to 70° C., and polymerization of propylene was conducted for two hours. During the polymerization, the pressure was maintained at 7 kg/cm$^2$. After completion of the polymerization, the slurry containing the formed polymer was subjected to filtration to separate a white powder polymer and a liquid portion, to obtain 5.79 kg of a propylene polymer composition inclusive of the 3-methylbutene-1 polymer.

The content of the 3-methylbutene-1 polymer in the propylene polymer composition was 47 ppm by weight. this polymer had MFI of 3.0 g/10 min, a melting point of 163.8° C. and a crystallization temperature of 122.5° C.

COMPARATIVE EXAMPLE 4

Into a 1 l induction stirring type autoclave thoroughly flushed with purified argon, 2,500 mg of the catalyst obtained in Catalyst Preparation Example 4, 400 ml of purified n-hexane and 20 g of purified 3-methylbutene-1 were charged at room temperature under sealing with argon. Then, the temperature was raised to 60° C., and 32.3 mmol of diethylaluminum chloride was added, and polymerization of 3-methylbutene-1 was conducted for 30 minutes. Then, the product was washed with purified n-hexane at room temperature to obtain a 3-methylbutene-1 polymer-containing catalyst having 2.5 g of 3-methylbutene-1 polymerized per g of the titanium catalyst component.

Into a 2 l induction stirring type autoclave thoroughly flushed wtih purified argon, 1,000 ml of purified n-hexane, 6.5 mmol of diethylaluminum chloride and the above 3-methylbutene-1 polymer-containing catalyst in an amount of 501 mg as the Ti catalyst component, were charged under sealing with argon. Then, 0.2 kg/cm$^2$ of hydrogen was added, and the temperature was raised to 60° C. Then, propylene was added to bring the propylene pressure to 7.0 kg/cm$^2$, and homopolymerization of propylene was conducted. Ninety minutes later, propylene was purged, and the catalyst was removed by a solvent mixture of isobutanol and n-hexane to obtain 155 g of a propylene polymer composition inclusive of the 3-methylbutene-1 polymer.

The content of the 3-methylbutene-1 polymer in the propylene polymer composition was 0.83% by weight. This polymer had MFI of 2.7 g/10 min, a melting point of 163.0° C. and a crystallization temperature of 118.5° C.

EXAMPLE 6

Into a 2 l induction stirring type autoclave thoroughly flushed with purified argon, 800 ml of purified n-hexane and then 13.0 mmol of diethylaluminum chloride and 4,000 mg of the solid catalyst component obtained in Catalyst Preparation Example 1 were charged at room temperature under sealing with argon, and the temperature was raised to 70° C. Then, 206 ml of 3-methylbutene-1 was charged, and polymerization of 3-methylbutene-1 was conducted at 70° C. for 30 minutes.

Then, unreacted 3-methylbutene-1 was purged, and the product was washed with purified n-hexane. The amount of the obtained 3-methylbutene-1 polymer was 11.0 g per g of the solid catalyst component.

This 3-methylbutene-1 polymer had a melting point of 308° C. and a heat of fusion of 16 cal/g.

Then, into a 24 l induction stirring type autoclave thoroughly flushed with purified argon, 52 mmol of diethylaluminum chloride, 1.7 mmol of methyl methacrylate and 9 l of purified n-hexane were charged at room temperature under sealing with argon, and 0.3 kg/cm$^2$ of H$_2$ was added. Then, the temperature was raised to 70° C., and the above catalyst component was introduced in an amount of 1,330 mg as the Ti catalyst component. Then, propylene was added to bring the propylene pressure to 6 kg/cm$^2$, and homopolymerization of propylene was conducted. 4.5 hours later, propylene was purged, and the catalyst was removed by a solvent mixture of isobutanol and n-hexane to obtain 4,890 g of a propylene polymer composition inclusive of the 3-methylbutene-1 polymer.

The content of the 3-methylbutene-1 polymer in the propylene polymer composition was 0.299% by weight.

To 100 parts by weight of this polymer, the following stabilizers were added and the mixture was granulated and pelletized by a 30 mm Φ extruder.

0.1 part by weight of calcium stearate, 0.2 part by weight of BHT (2,6-di-t-butylhydroxytoluene), and 0.08 part by weight of Irganox 1010 {tetrakis[methylene-3-(3′,5′-di-t-butyl-4-hydroxyphenyl)propionate]methane, antioxidant, manufactured by Ciba Geigy}.

This polymer had MFI of 1.85 g/10 min, a melting point 164.0° C. and a crystallization temperature of 126.2° C. The boiling heptane non-extracted content of the polymer powder was 98.3%.

EXAMPLE 7

4.0 parts by weight of the polymer obtained in Example 2 and as stabilizers, 0.1 part by weight of calcium stearate, 0.2 part by weight of BHT (2,6-di-t-butyl-hyroxytoluene) and 0.08 part by weight of Irganox 1010 {tetrakis[methylene-3-(3′,5′-di-t-butyl-4hydroxyphenyl)propionate]methane, antioxidant, manufactured by Ciba Geigy}, were added to 96 parts by weight of propylene homopolymer 1220 FP (MFI: 1.9 g/10 min, melting point: 161.3° C., crystallization temperature: 108.6° C.) manufactured by Mitsubishi Kasei Corporation, and the mixture was mixed by a Henshell mixer and granulated and pelletized by a 50 mm Φ extruder. This resin composition had a 3-methylbutene-1 polymer content of 0.20% by weight, MFI of 1.7 g/10 min, a melting point of 164.1° C. and a crystallization temperature of 125.2° C.

COMPRATIVE EXAMPLE 5

Into a 2 l induction stirring type autoclave thoroughly flushed with purified argon, 800 ml of purified n-hexane and then 32.5 mmol of diethylaluminum chloride and 10.0 g of the solid catalyst component obtained in Catalyst Preparation Example 1, were charged at room temperature under sealing with argon, and the temperature was raised to 70° C. Then, 10 ml of 3-methylbutene-1 was charged, and polymerization of 3-methylbutene-1 was conducted at 70° C. for 30 minutes.

Then, unreacted 3-methylbutene-1 was purged, and the product was washed with purified n-hexane. The amount of the obtained 3-methylbutene-1 polymer was 0.39 g per g of the solid catalyst component.

Then, into a 24 l induction stirring type autoclave thoroughly flushed with purified argon, 186 mmol of diethylaluminum chloride, 6.1 mmol of methyl methacrylate and 9 l of purified n-hexane were charged at room temperature under sealing with argon, and 0.2 kg/cm² of H₂ was added. Then, the temperature was raised to 70° C., and the above catalyst component was introduced in an amount of 4.7 g as the Ti catalyst component. Then, propylene was added to bring the propylene pressure to 4 kg/cm², and homopolymerization of propylene was conducted. 1.6 hours later, propylene was purged, and the catalyst was removed by a solvent mixture of isobutanol and n-hexane to obtain 4,500 g of a propylene polymer composition inclusive of the 3-methylbutene-1 polymer.

The content of the 3-methylbutene-1 polymer in the propylene polymer composition was 0.041% by weight. To this polymer, the stabilizers were incorporated in the same manner as in Example 6, and the mixture was granulated and pelletized by a 30 mm Φ extruder.

This polymer had MFI of 2.3 g/10 min, a melting point of 164.1° C. and a crystallization temperature of 119.0° C.

COMPARATIVE EXAMPLE 6

Into a 2 l induction stirring type autoclave thoroughly flushed with purified argon, 800 ml of purified n-hexane and then 5.4 mmol of triethylaluminum and 4.0 g of the solid catalyst component prepared in Catalyst Preparation Example 2 were charged at room temperature under sealing with argon, and the temperature was raised to 55° C. Then, 250 ml of 3-methylbutene-1 was charged, and polymerization of 3-methylbutene-1 was conducted at 55° C. for 60 minutes.

Then, unreacted 3-methylbutene-1 was purged, and the product was washed with purified n-hexane. The amount of the obtained 3-methylbutene-1 polymer was 16.1 g per g of the solid catlayst component.

Then, into a 24 l induction stirring type autoclave thoroughly flushed with purified argon, 8.4 kg of propylene was charged, and 25.8 mmol of triethylaluminum, 7.8 mmol of p-methylmethylbenzoate and 1 kg cm² of H₂ were charged. Further, the above 3-methylbutene-1 polymer-containing catalyst component was added in an amount of 744 mg as the Ti catalyst component, and polymerization of propylene was conducted. Twenty minutes later, propylene was purged to obtain 4.9 kg of a propylene polymer composition inclusive of the 3-methylbutene-1 polymer.

The content of the 3-methylbutene-1 polymer in the propylene polymer composition was 0.24% by weight. To this polymer, the stabilizers were incorporated in the same manner as in Example 6, and the mixture was granulated and pelletized by a 30 mm Φ extruder. This polymer had MFI of 2.0 g/10 min, a melting point of 163.8° C. and a crystallization temperature of 122.2° C.

EXAMPLE 8

The composition obtained in Example 7 was extruded by a T-die extruder at a resin temperature of 295° C. at a chill roll temperature of 60° C. to obtain a sheet having a thickness of 1.5 mm. This sheet had a haze of 77%, a parallel light transmittance of 4.7% and a spherical crystal size of from 2 to 3 μm.

This sheet was biaxially stretched by means of a Long stretcher (standard type) at a stretching temperature of 150° C. for 7×7 times (preheating for 2 minutes→simultaneous biaxial stretching→post heating for 1 minutes→cooling).

The stretched product had a thickness of about 30 μm, and the obtained film had a parallel light transmittance of 86%.

COMPARATIVE EXAMPLE 7

The composition obtained in Comparative Example 5 was extruded by a T-die extruder at a resin temperature of 295° C. at a chill roll temperature of 60° C. to obtain a sheet having a thickness of 1.5 mm. This sheet had a haze of 80%, a parallel light transmittance of 1.0% and a spherical crystal size of 10 μm.

This sheet was biaxially stretched by means of a Long stretcher (standard type) at a stretching temperature of 150° C. for 7 x 7 times (preheating for 2 minutes→simultaneous biaxial stretching→post heating for 1 minutes→cooling).

The stretched product had a thickness of about 30 μm, and the obtained film had a parallel light transmittance of 78%.

COMPARATIVE EXAMPLE 8

The composition obtained in Comparative Example 6 was extruded by a T-die extruder at a resin temperature of 295° C. at a chill roll temperature of 60° C. to obtain a sheet having a thickness of 1.5 mm. This sheet had a haze of 79%, a parallel light transmittance of 1.8% and a spherical crystal size of 6 μm.

This sheet was biaxially stretched by means of a Long stretcher (standard type) at a stretching temperature of 150° C. for 7×7 times (preheating for 2 minutes→simultaneous biaxial stretching→post heating for 1 minutes→cooling).

The stretched product had a thickness of about 30 μm, and the obtained film had a parallel light transmittance of 81%.

COMPARATIVE EXAMPLE 9

A propylene polymer was obtained in the same manner as in Example 6 except that polymerization of propylene only was conducted without using 3-methylbutene-1. This polymer was sheeted in the same manner as in Example 8. The obtained sheet had a haze of 62%, a parallel light transmittance of 0.3% and a spherical crystal size of 30 μm.

Further, this sheet was stretched in the same manner as in Example 8 to obtain a film having a thickness of about 30 μm. This film had a parallel light transmittance of 66% and a crystallization rate of 180 sec.

sition had a 3-methylbutene-1 polymer content of 0.20% by weight, MFI of 6.5 g/10 min, a melting point of 149.5° C. and a crystallization temperature of 113.2° C.

TABLE 1

| No. | Polymer composition | | | Sheet product | | | Film |
|---|---|---|---|---|---|---|---|
| | Amount of prepolymerized 3MB1 (g/g-TiCat) | Amount of 3MB1 polymer (wt %) | Crystallization temp. (°C.) | Haze (%) | Parallel light transmittance (%) | Spherical crystal size (μm) | Parallel light transmittance (%) |
| Example 1 | 118.7 | 4.0 | 126.6 | — | — | — | — |
| Example 2 | 105.3 | 5.0 | 128.0 | — | — | — | — |
| Example 3 | 20.5 | 1.0 | 128.6 | — | — | — | — |
| Example 4 | 12.0 | 0.3 | 126.0 | — | — | — | — |
| Example 5 | 257.4 | 0.7 | 125.5 | — | — | — | — |
| Comparative Example 1 | 1.2 | 1.1 | 122.3 | — | — | — | — |
| Comparative Example 2 | 201.6 | 5.4 | 122.2 | — | — | — | — |
| Comparative Example 3 | 0.95 | 0.0047 | 122.5 | — | — | — | — |
| Comparative Example 4 | 2.5 | 0.83 | 118.5 | — | — | — | — |
| Example 6 | 11.0 | 0.299 | 126.2 | — | — | — | — |
| Example 7 | 105.3 | 0.2 | 125.2 | — | — | — | — |
| Comparative Example 5 | 0.39 | 0.041 | 119.0 | — | — | — | — |
| Comparative Example 6 | 16.1 | 0.24 | 122.2 | — | — | — | — |
| Example 8 | 105.3 | 0.2 | 125.2 | 77 | 4.7 | 2-3 | 86 |
| Comparative Example 7 | 0.39 | 0.041 | 119.0 | 80 | 1.0 | 10 | 78 |
| Comparative Example 8 | 16.1 | 0.24 | 122.2 | 79 | 1.8 | 6 | 81 |
| Comparative Example 9 | — | — | 117.7 | 62 | 0.3 | 30 | 66 |
| Example 9 | 12.0 | 0.26 | 116.0 | — | — | — | — |
| Comparative Example 10 | — | — | 100.2 | — | — | — | — |
| Example 10 | 105.3 | 0.20 | 113.2 | — | — | — | — |

EXAMPLE 9

The polymerization operation was conducted in the same manner as in Example 4 except that during the polymerization of propylene, ethylene gas was supplied under pressure uniformly into the autoclave so that the ethylene content in the resulting propylene copolymer would be about 2% by weight. As a result, 370 g of propylene copolymer was obtained. The content of the 3-methylbutene-1 polymer in the propylene copolymer composition was 0.26% by weight. This polymer had MFI of 3.2 g/10 min, a melting point of 148.5° C. and a crystallization temperature of 116.0° C. The ethylene content was 2.2% by weight.

COMPARATIVE EXAMPLE 10

A propylene-ethylene copolymer (ethylene content: 2.9% by weight) was obtained in the same manner as in Example 10 except that a Ti solid catalyst component containing no 3-methylbutene-1 polymer was used. This copolymer had MFI of 3.1 g/10 min, a melting point of 143.5° C. and a crystallization temperature of 100.2° C.

EXAMPLE 10

The keading was conducted in the same manner as in Example 7 except that instead of the propylene homopolymer 1220 FP manufactured by Mitsubishi Kasei Corporation, a propylene-ethylene copolymer 6500 JP (MFI: 7.0 g/10 min, melting point: 143.8° C., crystallization temperature: 100° C.) manufactured by Mitsubishi Kasei Corporation, was used. This resin compo- The polymer composition and the film of the present invention are excellent in the transparency, and they are useful for various wrapping materials and other applications. Thus, the practical significance of the present invention is substantial.

What is claimed is:

1. A highly crystalline propylene polymer composition which comprises (A) a propylene polymer or a copolymer of propylene and another α-olefin having from 2 to 18 carbon atoms, and (B) a propylene polymer composition which is obtained by preliminarily polymerizing, in the presence of a catalyst comprising (a) a solid titanium trichloride catalyst complex containing a complexing agent and having an aluminum content of at most 0.15 by atomic ratio of aluminum to titanium and (b) an organoaluminum compound and (c) optionally an electron donative compound, 3-methylbutene-1 in an amount exceeding 10 g per g of said solid titanium trichloride catalyst complex and then polymerizing propylene, or propylene and other α-olefin having from 2 to 18 carbon atoms, in an amount of at least 1,000 g per g of said solid titanium trichloride catalyst complex, and which contains from 0.01 to 20% by weight of the 3-methylbutene-1 polymer based on the total weight of the 3-methylbutene-1 polymer-containing propylene polymer composition.

2. The composition according to claim 1, wherein the atomic ratio of aluminum to titanium in the solid titanium trichloride catalyst complex is at most 0.1.

3. The composition according to claim 1, wherein the molar ratio of the organoaluminum compound to titanium in the solid titanium trichloride catalyst complex is from 0.1 to 100.

4. The composition according to claim 1, wherein 3-methylbutene-1 is preliminarily polymerized in an amount exceeding 15 g per g of the solid titanium trichloride catalyst complex.

5. The composition according to claim 1, wherein the complexing agent in the solid titanium trichloride catalyst complex is at least one member selected from the group consisting of an ether, a thioether, an amine, an amide, a ketone, an ester and a phosphine.

6. The composition according to claim 5, wherein the complexing agent in the solid titanium trichloride catalyst complex is a dialkyl ether.

7. The composition according to claim 1, wherein the 3-methylbutene-1 polymer is present in an amount of from 0.05 to 5% by weight based on the total weight of the component B.

8. The composition according to claim 1, wherein said other $\alpha$-olefin is an $\alpha$-olefin having from 2 to 10 carbon atoms.

9. The composition according to claim 1, wherein the organoaluminum compound is represented by the formula $AlClR_2$ wherein R is an alkyl group having from 1 to 18 carbon atoms.

10. The composition according to claim 1, wherein the solid titanium trichloride catalyst complex is a complex obtained by reducing titanium tetrachloride with an organoaluminum compound of the formula $AlR_nX_{3-n}$ wherein R is a hydrocarbon group having from 1 to 20 Carbon atoms and X is a halogen atom, in the presence of a dialkyl 11. A highly transparent propylene film which is made of a propylene polymer composition comprising (A) a propylene polymer or a copolymer of propylene and another $\alpha$-olefin having from 2 to 18 carbon atoms, and (B) a propylene polymer composition obtained by preliminarily polymerizing, in the presence of a catalyst comprising (a) a solid titanium trichloride catalyst complex containing a complexing agent and having an aluminum content of at most 0.15 by atomic ratio of aluminum to titanium and (b) an organoaluminum compound and (c) optionally an electron donative compound, 3-methylbutene-1 in an amount exceeding 10 g per g of said solid titanium trichloride catalyst complex and then polymerizing propylene, or propylene and other $\alpha$-olefin having from 2 to 18 carbon atoms, in an amount of at least 1,000 g per g of said solid titanium trichloride catalyst complex, and which contains from 0.003 to 0.5% by weight of the 3-methylbutene-1 polymer based on the total weight of the 3-methylbutene-1 polymer-containing propylene polymer composition.

12. The polypropylene film according to claim 1, wherein the atomic ratio of aluminum to titanium in the solid titanium trichloride catalyst complex is at most 0.1.

13. The polypropylene film according to claim 11, wherein the molar ratio of the organoaluminum compound to titanium in the solid titanium trichloride catalyst complex is from 0.1 to 100.

14. The polypropylene film according to claim 11, wherein 3-methylbutene-1 is preliminarily polymerized in an amount exceeding 15 g per g of the solid titanium trichloride catalyst complex.

15. The polypropylene film according to claim 11, wherein the complexing agent in the solid titanium trichloride catalyst complex is at least one member selected from the group consisting of an ether, a thioether, an amine, an amide, a ketone, an ester and a phosphine.

16. The polypropylene film according to claim 15, wherein the complexing agent in the solid titanium trichloride catalyst complex is a dialkyl ether.

17. The polypropylene film according to claim 11, wherein the organoaluminum compound is represented by the formula $AlClR_2$ wherein R is an alkyl group having from 1 to 18 carbon atoms.

18. The polypropylene film according to claim 11, wherein the solid titanium trichloride catalyst complex is a complex obtained by reducing titanium tetrachloride with an organoaluminum compound of the formula $AlR_nX_{3-n}$ wherein R is a hydrocarbon group having from 1 to 20 carbon atoms and X is a halogen atom, in the presence of a dialkyl ether.

19. The polypropylene film according to claim 11, wherein the polypropylene film is obtained by extruding the 3-methylbutene-1 polymer-containing propylene polymer composition in a molten state from a T-die and then cooling and solidifying it by a chill roll of a temperature of from 40 to 100° C.

20. The composition according to claim 1, wherein the weight ratio of A to B ranges from 95:5 to 99.985:0.015.

21. The composition according to claim 1, wherein the weight ratio of A to B ranges from 95:5 to 99.94:0.06.

22. The composition according to claim 1, wherein the melt index of the 3-methylbutene-1 polymer is not more than 100 g/10 min.

23. The composition according to claim 1, wherein the melt index of the 3-methylbutene-1 polymer is not more than 50 g/10 min.

* * * * *